(12) United States Patent
Musgrave et al.

(10) Patent No.: US 7,674,869 B2
(45) Date of Patent: *Mar. 9, 2010

(54) MINI-RANDOM COPOLYMER RESINS HAVING IMPROVED MECHANICAL TOUGHNESS AND RELATED PROPERTIES SUITABLE FOR THIN WALL THERMOFORMING APPLICATIONS

(75) Inventors: Mike Musgrave, Houston, TX (US); LuAnn Kelly, Friendswood, TX (US); Peter Selg, Masnuy-St-Pierre (BE)

(73) Assignee: Fina Technology, Inc., Houston, TX (US)

( * ) Notice: Subject to any disclaimer, the term of this patent is extended or adjusted under 35 U.S.C. 154(b) by 279 days.

This patent is subject to a terminal disclaimer.

(21) Appl. No.: 11/005,918

(22) Filed: Dec. 7, 2004

(65) Prior Publication Data

US 2005/0203264 A1    Sep. 15, 2005

Related U.S. Application Data

(60) Provisional application No. 60/527,797, filed on Dec. 8, 2003.

(51) Int. Cl.
  *C08L 23/14* (2006.01)
  *C08L 23/16* (2006.01)
(52) U.S. Cl. ............. 526/348; 526/351; 524/579; 524/582; 524/583; 524/462; 525/240; 525/199
(58) Field of Classification Search ............... 524/349, 524/151, 152, 153, 583, 584, 545, 546, 582, 524/462; 526/351, 352, 348; 528/396; 525/416, 525/199, 280, 240; 219/725
See application file for complete search history.

(56) References Cited

U.S. PATENT DOCUMENTS

| | | | | |
|---|---|---|---|---|
| 5,106,911 | A * | 4/1992 | Chapman et al. | 525/199 |
| 5,140,053 | A * | 8/1992 | Yamamoto et al. | 521/142 |
| 5,330,808 | A * | 7/1994 | Duff et al. | 428/35.7 |
| 5,856,386 | A * | 1/1999 | Sakai et al. | 524/271 |
| 6,211,501 | B1 * | 4/2001 | McCarthy et al. | 219/725 |
| 6,384,123 | B1 * | 5/2002 | Young | 524/451 |
| 6,465,551 | B1 * | 10/2002 | Zhao et al. | 524/284 |
| 6,476,172 | B1 * | 11/2002 | Wachowicz et al. | 526/348.1 |
| 6,657,024 | B1 * | 12/2003 | Blackmon et al. | 526/128 |
| 2001/0023270 | A1 * | 9/2001 | Stein et al. | 524/128 |
| 2004/0122196 | A1 * | 6/2004 | Pierini et al. | 526/351 |

* cited by examiner

*Primary Examiner*—David Wu
*Assistant Examiner*—Rip A. Lee
(74) *Attorney, Agent, or Firm*—Tenley R. Krueger

(57) ABSTRACT

A random copolymer having improved mechanical toughness and properties suitable for thin wall thermoforming applications is provided. The random copolymer exhibits the following physical properties: a flexural modulus profile having a 2% flexural modulus of about 168,000 psi, a 1% flexural modulus of about 190,000 psi, and a 0.4% flexural modulus of about 199,000 psi; a melt flow rate of at least about 2.0 g/10 min.; and a haze of less than about 40%. The random copolymer preferably comprises a copolymer of ethylene and propylene, wherein the ethylene content is in the range of from about 0.2% to about 0.8% ethylene by weight of the copolymer. The random copolymer also preferably includes a stabilizer and a clarifying agent such as a sorbitol based clarifier or a nucleator. Various articles of manufacture such as thermoformed containers and packaging may be formed from the random copolymer.

5 Claims, 3 Drawing Sheets

MINI-RANDOM COPOLYMER RESINS HAVING IMPROVED MECHANICAL TOUGHNESS AND RELATED PROPERTIES SUITABLE FOR THIN WALL THERMOFORMING APPLICATIONS

CROSS-REFERENCE TO RELATED APPLICATIONS

This application is a continuation of U.S. Provisional Patent Application Ser. No. 60/527,797 filed Dec. 8, 2003.

FIELD OF THE INVENTION

The present disclosure relates to random copolymer resins. More particularly, the present disclosure relates to ethylene-propylene copolymer resins that exhibit enhanced processability, clarity, toughness, and thermoforming characteristics while substantially retaining stiffness and strength.

BACKGROUND OF THE INVENTION

Polypropylene materials are among the most versatile and commonly used thermoplastics in the world today. Commercial grade polypropylenes are typically produced using either a Ziegler-Natta or metallocene catalyst mechanism in a polymerization process. Many industries, such as the packaging industry, utilize these polypropylene materials in various manufacturing processes, such as extrusion, injection molding, thermoforming, and blow molding to create a variety of finished goods.

Within the packaging industry, there are a number of unique applications that ideally require strong and substantially clear polymers. Medical articles, food storage containers, and other products that can readily be formed by thermoforming and blow molding techniques are either in direct contact with blood or other bodily fluids or with food or other items that are to be ingested or taken into the body. Thus, it would be desirable to use polymers having high clarity and strength and a very low extractables content for these applications. Accordingly, there is a need for Ziegler-Natta polypropylene blends having improved thermoforming and blow molding characteristics while retaining outstanding toughness, stiffness, strength, and clarity for demanding food or drug packaging applications, especially for cold temperature end use applications.

SUMMARY OF THE INVENTION

According to an embodiment a random copolymer exhibits the following physical properties: a flexural modulus profile having a 1% flexural modulus of from about 180,000 to about 190,000 psi; a melt flow rate of from about 0.5 to about 4.0 g/10 min., desirably about 2.0 g/10 min.; and a haze of less than about 40%. The random copolymer preferably comprises a copolymer of ethylene and propylene, wherein the ethylene content is in the range of from about 0.2% to about 0.8% ethylene by weight of the copolymer. The random copolymer also preferably includes antioxidants, stabilizers, and a clarifying agent such as a sorbitol based clarifier or a nucleator.

Other properties that the random copolymer possesses are a tensile modulus of from about 180,000 to about 220,000 psi, a tensile strength at yield of at least about 4,700 psi, a tensile strength at break of at least about 2,900 psi, an elongation at yield of from about 8 to about 13%, and an elongation at break of at least about 110%. In addition, the random copolymer has an Izod impact notched value of from about 0.4 to about 1.2 ft-lb/in at 23° C., desirably about 1.0 ft-lb/in at 23° C.; a heat distortion temperature of at least about 70-92° C. at 66 psi for a ⅛ inch plaque; and a melt temperature of about 155-160° C.

Another embodiment includes an article of manufacture including the foregoing random copolymer. The article of manufacture may be, for example, a thermoformed food storage container that is microwaveable, thermoformed packaging for pharmaceutical products, a blow molded food storage container, extrusion blow molded bottles, injection blow molded bottles, or a blow molded liquid container. These thermoformed or blow molded articles may be formed by first extruding the random copolymer into a sheet. In one embodiment, the random copolymer may be coextruded with a secondary copolymer to form a multilayered sheet having the secondary copolymer as the innermost layer. Examples of end use articles include clear lids, cups, and domes suitable for use as containers for food storage, health and beauty products, pharmaceutical products, specimen containers, etc.

DETAILED DESCRIPTION OF THE INVENTION

Figure 1:
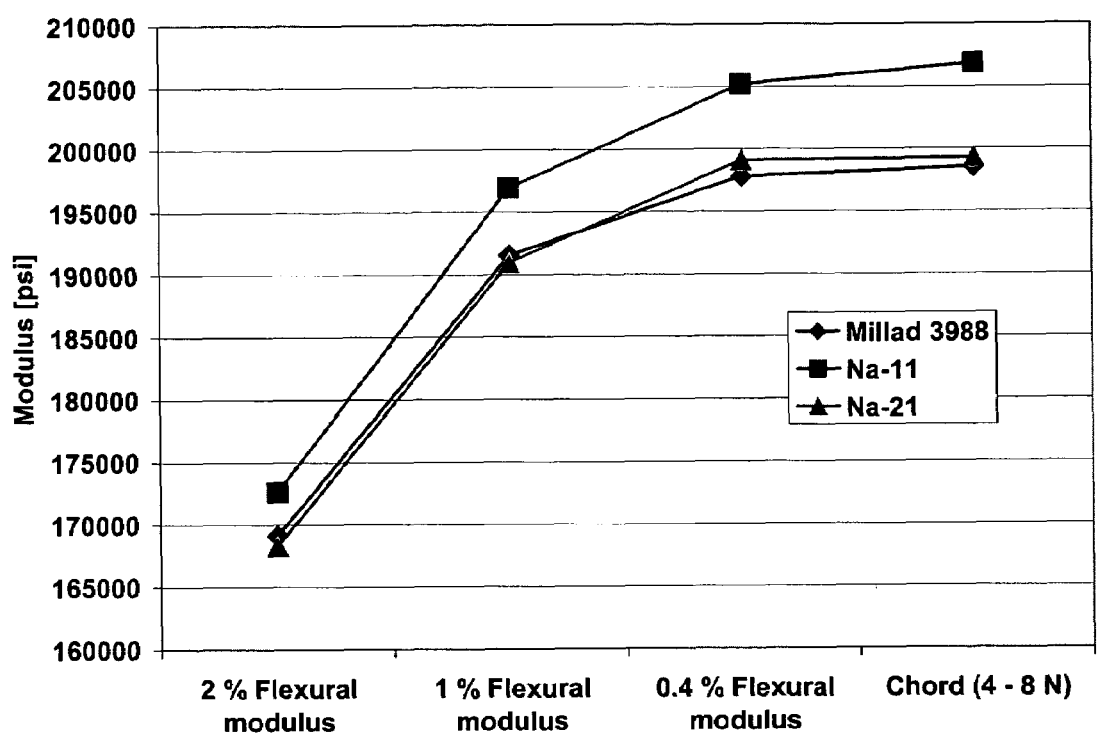
FIG. 1 illustrates the flexural moduli of random ethylene-propylene copolymers formulated with different nucleating agents.

Disclosed herein is a random copolymer of propylene and ethylene catalyzed with a Ziegler-Natta catalyst, the random copolymer having a low ethylene content of from about 0.2% to about 0.8% by weight of the copolymer. The random copolymer exhibits relatively good impact resistance and mechanical strength along with enhanced thermoforming characteristics. Clarifiers and nucleators can optionally be added to the random copolymer for clarity enhancement.

Disclosed herein are random copolymers comprised of propylene ($C_3$), one of a $C_2$, $C_4$, $C_5$, $C_6$, $C_7$ or $C_8$ olefin monomer, and an additive package. In an embodiment, the random copolymers include of from about 95.0 to about 99.9 mol % of $C_3$; or from about 97 to about 99.5 mol % of $C_3$, or from about 98.5 to about 99.4 mol % of $C_3$; and from about 0.1 to about 5.0 mol % of at least one co-monomer, such as ethylene ($C_2$), $C_4$-$C_8$ olefins, and combinations thereof. As used herein, the term mini-random copolymer (mini-rep) is used to denote $C_2$-$C_3$ random copolymers having low levels of $C_2$, desirably from about 0.2 to about 0.8% $C_2$ by weight of the copolymer, or from about 0.6% $C_2$ by weight of the copolymer. Hereinafter, all weight percentages (wt %) are by weight of the polymer unless otherwise specified. A mini-rep is typically characterized as having less brittleness and better transparency and clarity than a pure homopolymer. An example of a commercially available 0.6 wt % $C_2$, $C_2$-$C_3$ mini-RCP is FINA EOD 00-28 (EOD 00-28) available from TOTAL PETROCHEMICALS USA, INC. of LaPorte, Tex.

The use of mini-RCPs of generally isotactic structure in accordance with the present invention provides for polymer structures which can be correlated with desired end product characteristics, such as processability, stiffness, toughness, and optical properties and/or characteristics necessary for rigid thermoformed packaging applications. End products include, but are not limited to, films, sheets, injection molded products, and the like.

The random copolymer composition of this invention is suitable in any application for which olefin polymers are known to be useful. Such uses include the production of molded objects, mechanical goods, and extruded materials. The polymeric compositions of this invention may be used in injection molding operations, blow molding operations, compression molding operations, and the like. The polymeric compositions of this invention may also be extruded or co-extruded to produce films, sheets, textiles, coatings, pipes, wire coating, fibers, and the like.

As summarized in Table 1, a highly isotactic mini-rep including from about 0.2 to about 0.8 wt % $C_2$ exhibits a flexural modulus profile, as determined using ASTM D790, having a 1% flexural modulus of from about 180,000 to about 220,000 psi. It also exhibits a melt flow rate of from about 2.0 to about 2.8 g/10 min. The melt flow rate (or melt flow index) may be defined by various standards, including ASTM D1238, ASTM D3364, or ISO 1133. Generally, melt flow rate indicates the quantity of a melted polymer resin that will flow through an orifice at a specified temperature and under a specified load. For all purposes disclosed in this application, when melt flow rate is referred to, it constitutes the melt flow rate measured by ASTM D1238 at 230° C. and under a load of 2.16 kg using a melt flow extrusion plactometer.

The mini-rep or articles formed therefrom also have the following properties: a haze of from about 5% to about 40%; a weight average molecular weight (Mw×1000) of from about 260 to about 600; a degree of isotacticity of about 97%; a weight average molecular weight distribution in a range from about 5 to about 10; and a xylene solubles level of from about 3 to about 5.5 wt %. The methods used to determine these properties are also provided in Table 1.

TABLE 1

| | Method | Minimum | Maximum |
|---|---|---|---|
| 1% flexural modulus, psi | ASTM D790 | 180,000 | 220,000 |
| Haze, % | ASTM D1003 | 5 | 40 |
| Melt Flow Rate, g/min. | ASTM D1238 | 2.0 | 2.8 |
| Weight Average Molecular Weight (Mw × 1000) | | 260 | 600 |
| Weight Average Molecular Weight Distribution | | 5 | 10 |
| Xylene Solubles, wt % | | 3.0 | 5.5 |
| DSC Melt Point, ° C. | | 150 | 160 |

Mini-RCPs are formed by the catalyzed polymerization of a mixture of $C_2$ and $C_3$ monomers. Desirably, the mini-RCPs used herein are $C_3$ based, meaning that the $C_2$-$C_3$ random copolymer desirably has a greater weight percentage of $C_3$ than $C_2$, and more desirably has a substantially greater weight percentage of $C_3$ than $C_2$. In an embodiment, the $C_2$-$C_3$ random copolymer desirably has from about 0.2 wt % to about 0.8 wt % $C_2$, more desirably about 0.6 wt % $C_2$. The $C_2$-$C_3$ random copolymer is desirably catalyzed using a Ziegler-Natta catalyst as is known in the art. Isotactic $C_2$-$C_3$ random copolymers are usually prepared through the use of conventional Ziegler-Natta catalysts of the type disclosed, for example in U.S. Pat. Nos. 4,298,718 and 4,544,717, both to Myer et al, each of which is incorporated herein by reference. The polymerization of $C_2$ and $C_3$ monomers using Ziegler-Natta catalyst was conducted under appropriate reaction conditions known to a person of ordinary skill in the art.

Various additives may be added in different embodiments of the mini-RCP polymeric material. The additives may be added singly or combined together in an additive package before being introduced to the random copolymer. For example, at least one clarifying agent, i.e., a material capable of enhancing the clarity of the copolymer, such as a nucleator or a clarifier, may optionally be added. Nucleators and clarifiers (a sub-class of nucleators) increase clarity by nucleating or increasing the rate of crystal formation in the copolymer. In general, both clarifiers and nucleators nucleate but not all nucleators clarify, although many do significantly reduce haze. During a normal crystallization process in which no clarifier has been added, relatively large crystals tend to form. These large crystals refract light and thus can reduce the clarity of a copolymer. When a clarifier is added, the higher rate of crystal formation induces formation of smaller crystals such as spherulites that tend to scatter less light. The smaller crystals allow light to pass without refraction, thus increasing the clarity of the copolymer.

Historically, nucleators have been used in polypropylene homopolymers to improve stiffness and increase processing speed. Nucleators are most commonly aromatic carboxylic-acid salts such as sodium benzoate. Many advanced nucleators that are classified as clarifiers are traditionally derivatives of dibenzylidene sorbitol (DBS). The all-organic sorbitol-based clarifiers can dissolve in the polymer at temperatures of from about 390° F. to about 430° F., whereas other nucleators typically do not dissolve. The dissolving action of the sorbitol may contribute to greater clarity by further reducing the size of the crystallites.

Any suitable clarifier or nucleator exhibiting desirable enhancement properties can be added to the random copolymer. An example of a commercially available clarifier is sold under the tradename Millad 3988, a powdered sorbitol available from Milliken Chemical of Spartanburg, S.C. An example of a nucleator is commercially available from Amfine Chemical under the tradename ADK Na-11 (Na-11), which is known to be a powerful nucleating agent. A more preferred nucleator is sold by Amfine Chemical under the tradename ADK Na-21 (Na-21). Nucleators such as Na-11 and Na-21 are generally regarded as being more thermally stable than sorbitol-based nucleators which are melt sensitive and tend to thermally decompose. Moreover, melt insensitive nucleators such as Na-11 and Na-21 work by dispersive mixing so that during each extrusion pass the nucleator is better mixed and dispersed within the polypropylene matrix, thereby leading to improved clarity. Sorbitol-based, melt sensitive nucleators, however, thermally decompose and cause plate-out onto processing equipment and ultimately exhibit less clarity (higher haze values) over numerous extrusion passes.

The U.S. Food and Drug Administration places an upper limit on clarifier materials, which in this case is typically about 4000 ppm. A desirable range for the clarifier level in the random copolymer is from about 900 ppm to about 3500 ppm. A more desirable clarifier level is from about 1700 ppm to about 2500 ppm. The most desirable range for the clarifier level is from about 1700 ppm to about 2200 ppm. A desirable range for the nucleator level in the random copolymer is from about 0.0001 to about 1 part by weight, more desirably from about 0.01 to about 1.0 part by weight, and most desirably from about 0.03 to about 0.5 part by weight, all parts being based on 100 parts by weight of the $C_2$-$C_3$ random copolymer.

If a clarifier or nucleator is to be included in the Ziegler-Natta random copolymer, it is typically added to the copolymer in the form of a powder or a fluff after the polymerization process described above but before the copolymer is melted and formed into pellets. Any of the techniques known in the art for blending polymeric components may be used. Suitable blending techniques include solution blending, solid state physical admixture, molten state admixture, extrusion admixture, roll milling, screw extrusion, and the like. Of these, solution blending generally produces the most uniform blend; however, mixing in the molten state with equipment such as a Banbury mixer, extruder, or roll mills is more convenient. In general, molten phase admixture is performed at temperatures within the range of from about 140° C. to about 270° C., but higher and lower temperatures may, in some cases, may be at least operable.

In addition to a clarifying agent, a fluropolymer and/or fluroelastomers may be added to the random copolymer to improve extrusion processing of the material. An examples of a suitable fluropolymers include Viton Free Flow available from DuPont-Dow Chemical and Dyneon available from 3M Company. In an embodiment, the fluropolymer is added to the copolymer in an amount of from about 100 ppm to about 1000 ppm. More desirably, the amount of fluropolymer added is from about 300 ppm to about 800 ppm, and most desirably the amount of fluropolymer added is from about 400 ppm to about 600 ppm.

Other additives that may optionally be introduced to the random copolymer include stabilizers, ultra-violet screening agents, oxidants, anti-oxidants, anti-static agents, ultraviolet light absorbents, fire retardants, processing oils, mold release agents, coloring agents, pigments/dyes, fillers, and/or the like with other components. The additives may be suited for the particular needs or desires of a user or maker, and various combinations of the additives may be used. For example, stabilizers or stabilization agents may be employed to help protect the copolymer resin from degradation due to exposure to excessive temperatures and/or ultraviolet light. Examples of suitable thermal stabilizers include, but are not limited to, pentaerythritol tetrakis (3,5-di-tert-butyl-4-hydroxyhydrocinnamate) which is commercially available from Ciba Specialty Chemicals Corporation (Ciba) under the tradename Ciba® Irganox® 1010 and tris(2,4-di-tert-butylphenyl)phosphite which is commercially available from Ciba under the tradename Ciba® Irgafos® 168. Another additive that may be employed is a modified calcium salt derived from stearic and lactic acids, commerically available from American Ingredients Company of Kansas City, Mo. under the tradename Pationic, 940, which serves as a lubricant and neutralizer. Alternatively, calcium sterate may be used as a lubricant and nuetralizer. The concentrations of the Irganox® 1010, the Irgafos® 168, and the Pationic 940 in the copolymer are about 400 ppm, about 1200 ppm, and about 500 ppm, respectively; alternatively in thermoforming applications from about 400 ppm to about 1000 ppm; and alternatively in blowmolding applications from about 1000 ppm to about 4000 ppm. The aforementioned additives may be used either singularly or in combination to form various formulations of the copolymer.

Standard techniques can be used to form the Ziegler-Natta catalyzed mini-RCPs of the invention into end use articles that exhibit improved clarity/optical properties, improved toughness at room and refrigerated temperatures, and enhanced forming characteristics without a significant loss of stiffness or strength. The improved toughness and processability exhibited by articles made from the mini-RCPs makes such articles useful in the packaging of food and drug items.

Injection molding, compression molding, sheet extrusion, thermoforming, blow molding, and other well-known product formation techniques may be used to create the end-use articles. Injection molding involves feeding a polymer material in a form such a powder or a pellet into a hopper where it is heated, plasticized, and then injected through a nozzle into a mold. Compression molding involves feeding a solid or molten polymer into a mold and compressing the mold to flow the polymer and form a part. The extrusion process involves feeding a polymer material in a form such as a powder or a pellet into an extruder where it is heated and then homogeneously mixed to form a melt. The melt is expelled from the extruder through a shaping die to produce various products such as tubes, profiles, sheets, and films. The thermoforming process involves heating a polymer sheet in an oven to a softened state, forming the softened sheet over a solid mold, cooling it to a rigid state, and then trimming the formed part from its web. The blow molding process can be used to produce hollow articles such as plastic bottles. There are several processes used to blow mold polymers. For example, extrusion blow molding involves inserting an extruded parison or preform into a two-part mold where it is inflated and cooled against the cold mold wall, and then removed by separating the two halves of the mold. Both thermoforming and blow molding processes require an extruded polymer starting material of suitable melt flow index, in either a sheet or parison form.

In an alternative embodiment, the mini-RCP of the present invention may be used in a coextruded process with one or more other polymeric materials, such as a random copolymer made using metallocene catalysts. It should be noted that copolymers made by the use of metallocene catalysts tend to have lower levels of xylene solubles (e.g., from about 0.2 wt % to about 1.0 wt %) than copolymers made via use of Ziegler-Natta catalysts (e.g., about 4.0 wt %). A metallocene random copolymer may be coextruded as the innermost lining material of a multi-layer sheet for a further molded product form, thereby taking advantage of the lower xylene solubles property of the metallocene random copolymer, as compared to Ziegler-Natta mini-RCPs. An end product may be made in this manner using less metallocene polymeric material than an end product formed entirely from metallocene random copolymer. The end product would retain the desired lower xylene solubles characteristics of the metallocene polymeric material along with the improved mechanical toughness and forming characteristics of the Ziegler-Natta catalyzed mini-RCPs disclosed herein.

Procedures for obtaining physical parameter measurements in the course of experimental work concerning the mini-RCPs of the present invention are described below.

Extruded sheets and/or injection-molded articles made from the mini-RCPs of the present invention were tested for clarity, strength, heat distortion, and twist resistance by the following methods or their equivalents: ASTM D3763, Standard Test Method for High Speed Puncture Properties of Plastics Using Load and Displacement Sensors (Dynatup Impact test); ASTM D5420, Standard Test Method for Impact Resistance of Flat, Rigid Plastic Specimen by Means of a Striker Impacted by a Falling Weight (Gardner Impact); ASTM D1003, Standard Test Method for Haze and Luminous Transmittance of Transparent Plastics; ASTM D256, Standard Test Methods for Determining the Izod Pendulum Impact Resistance of Plastics; ASTM D790, Standard Test Methods for Flexural Properties of Unreinforced and Reinforced Plastics and Electrical Insulating Materials; and ASTM D638, Standard Test Method for Tensile Properties of Plastics. All of the above mentioned ASTM standards are incorporated herein by reference.

The clarity of an article made from a polymer as described herein is measured by the Haze test, ASTM D2003, which measures the amount of scattering of light as it passes through a transparent material. A test specimen, typically a 50 millimeter (two inch) or 100 millimeter (four inch) disk, is placed inside a spectrophotometer which then takes automated measurements of the haze of the specimen. Haze measurements are typically given as percentages. The lower the haze percentages, the better the clarity of the material.

The Notched Izod test, ASTM D256, measures a material's resistance to breakage from a swinging pendulum. The standard specimen is a 2.5 inch by 0.5 inch by 0.125 inch bar that is typically notched near the center of one of the long sides to prevent deformation upon impact by the pendulum. The notch is typically about 0.1 inch deep. The specimen is placed in a test apparatus and a pendulum on the apparatus is allowed to swing down from a specified height and strike the notched side of the specimen. If the specimen does not break when struck by the pendulum, the test is repeated with heavier pendulums until breakage does occur. Impact strength can be calculated from the weight of the pendulum and the height from which it was released. Impact strengths are typically given in Joules per meter, foot-pounds per inch, or other appropriate units.

The stiffness of an article made from the mini-RCPs described herein is measured by the Flexural Modulus Test, ASTM D790, which determines a material's stiffness by measuring the force required to bend a sample of the material. Test specimens are typically 2.5 inch by 0.5 inch by 0.125 inch bars, but other sizes and shapes could be used. A test specimen is typically placed across a span and a load is applied to the center of the specimen. The load is increased until a specified deflection occurs. The flexural force is determined by the length of the span, the load, and the amount of deflection. Force is typically given in Pascals, pounds per square inch, or other appropriate units.

The Tensile Modulus test ASTM D638 also provides mechanical strength measurements for articles made from the polymer materials described herein. ASTM D638 measures the force required to stretch a specimen to the breaking point and the amount the specimen elongates when stretched to that point. Test specimens are often in the shape of bars but other shapes can be used as appropriate for the material being tested. The test procedure is typically performed by an automated apparatus specially designed for performing tensile tests. Two gripping devices within the apparatus are clamped to the specimen at a specified distance from each other. The apparatus moves the gripping devices away from each other so that they pull the specimen apart and stretch it until it breaks. Automated data acquisition modules within the test apparatus measure and record variables such as tensile modulus, tensile strength at yield and at break, stress, strain, elongation at yield, and elongation at break. Tensile modulus is typically given in Pascals, pounds per square inch, or other appropriate units.

Heat distortion of articles made from the polymeric material described herein is measured via the Heat Deflection Temperature test, ASTM D648, which measures the temperature at which a formed article will distort to simulate the microwaveablity of the product. Again, test specimens are typically in the shape of bars but other shapes can be used as appropriate for the material being tested. The bars are placed under a deflection measuring device, such as an Atlas HDV2 DTUL/Vicat tester. A load of 0.45 MPa or 1.80 MPa is then placed on each specimen. The specimens are then lowered into a silicone oil bath where the temperature is raised at 2° C. per minute until they deflect 0.25 mm.

Many materials exhibit lower strength or impact resistance at reduced temperatures so it is sometimes appropriate to test materials at temperatures that simulate the intended end-use environment. A specimen can be conditioned at a specified temperature in a freezer then quickly removed, placed in a testing apparatus, and tested in one or more of the manners described above. ASTM and ISO do not specify a conditioning time or an elapsed time from the freezer to the commencement of the test but typical values are six hours of conditioning and five seconds from freezer to test commencement.

Another test used in evaluating the polymeric material of the present disclosure is a Dynamic Mechanical Analysis, which is used to measure the resistance of a material to twisting as well as evaluate the modulus over a wide temperature span ranging from room temperature up to the melting temperature (about 160° F. to about 170° F.). This test can be used to determine how the material softens and thermally fatigues with time. In this test the material is held in two grips to twist and bend the material while the temperature is increased from room temperature up to a temperature at which the material melts.

Melt flow for the mini-RCP resins was run using ASTM D1238, procedure A (manual operation) and procedure B (automatically timed flow). Specifically, melt flow for mini-RCP was run at 230° C. using a 2.16 kg load on the resin container. Melt flow rate (MFR) values are inversely proportional to the length of a polymer chain, thus a higher MFR value is reflective of a relatively short polymer chain length.

In determining xylene solubles, mini-RCP samples were dissolved in boiling xylene and allowed to crystallize at room temperature for 30 min followed by a 10 min quench in an ice bath. The mini-RCP solids were filtered, the filtrate was flashed, and the residual component was dried in a vacuum oven at 70° C. for 1 hour. The xylene soluble fraction is defined as a ratio of the soluble weight fraction to the initial weight sample.

Molecular weight measurements of the polymeric material disclosed herein were performed by gel permeation chromatography (GPC) using a Waters device at 135° C. with 1,2,4-trichlorobenzene as the elution solvent and BHT as the stabilizer. Three columns were used in series: two Shodox AT-806 and one Waters HT6E with a refractive index detector. Molecular weights were calculated using conventional broad standard calibration.

Mini-RCP samples were analyzed using a Perkin-Elmer Series 7 (power compensating unit) Differential Scanning Calorimeter. Samples were first heated to 210° C. at a rate of 10° C./minute, then held to 210° C. for 5 minutes to eliminate thermal history. The samples were then cooled to 50° C. at 10° C./minute, held for 1 minute, and then ramped to 190° C. at 10° C./minute. Melting temperatures and heats of fusion reported were taken from the second heat thermogram and the instrument was calibrated using Indium and Tin standards. In an embodiment, the mini-rep or articles formed therefrom also have a recrystallization peak of from about 120 to about 133° C. and a second melt peak of from about 155 to about 160° C., while the value for second melt energy of from about 90 to about 100 J/g.

EXAMPLES

The Ziegler-Natta catalyzed mini-RCP resin having been generally described, the following examples are given as particular embodiments of the polymeric material disclosed and to demonstrate the practice and advantages thereof. It is understood that the examples are given by way of illustration and are not intended to limit the specification or the claims to follow in any manner.

Various tests described earlier were performed on extruded sheets of varying thickness and injection molded articles made from the Ziegler-Natta mini-RCPs of the present disclosure and, for comparison, on articles formed from Ziegler-Natta catalyzed homopolymer materials. The polymeric materials varied in $C_2$ content, the amount of clarifier added, the amount of fluoropolymer added, and MFR. The mini-RCP resins used in the studies set out in Examples 1-3 were prepared with a Ziegler-Natta catalyst under appropriate polymerization conditions known in the art. The mini-RCP compositions described in Examples 1-9 and Comparative Examples 1 and 2 were then produced by first dry blending the base resin and additives followed by compounding via a single-screw extruder. Additionally, articles were created for Examples 1-9 and Comparative Examples 1 and 2 by injection molding methods known in the art. The injection molded articles were standard bars or plaques as appropriate for the type of test to be performed. Sets of multiple, identical articles were made from each polymeric material so that multiple tests could be performed on the articles.

Example 1

The mini-RCP of Example 1 (RCP1) contained 1800 ppm of the Millad 3988 clarifier. The base formulation for the sample was 400 ppm of Irganox® 1010, 1200 ppm of Irgafos® 168, and 500 ppm of Pationic 940. Such base formulation was chosen due to the fact that it tends to minimize plate-out tendency of mini-RCP resins. Table 2 shows the additive package used (including various nucleating agents) for the evaluation of the mini-RCP of Example 1 as compared with the mini-RCP additive packages of Example 2 and Example 3.

TABLE 2

| | | Sample | | |
| --- | --- | --- | --- | --- |
| | | Ex. 1 | Ex. 2 | Ex. 3 |
| | | | Ethylene % | |
| ADDITIVE PACKAGE | | 0.6 | 0.6 | 0.6 |
| Irganox ® 1010 | ppm | 400 | 400 | 400 |
| Irgafos ® 168 | ppm | 1200 | 1200 | 1200 |
| Pationic 940 | ppm | 500 | 500 | 500 |
| NA-11 | ppm | | 900 | |
| Milliad 3988 | ppm | 1800 | | |
| NA-21 | ppm | | | 900 |

The mini-RCP sample of Example 1 was subjected to a five-pass regrind study with an extruder temperature of 525° F. Passes 2 to 5 were done with 100% regrind material.

As shown in Table 3, the 2% flexural modulus value for the mini-RCP of Example 1 was about 169,115 psi, while the 1% flexural modulus value was about 191,514 psi. The 0.4% flexural modulus value for Example 2 was about 197,759 psi, and the chord (4-8N) value for the copolymer was about 198,533 psi.

The mini-RCP resin of Example 1 also exhibited a desirable tensile modulus value of about 180,301 psi. Tensile strength at yield value for the mini-RCP was about 4,778 psi, while tensile strength at break value was about 2,794 psi. The elongation at yield for the copolymer was about 13.7%, while elongation at break was about 62%. With regard to Izod values, the Izod impact, notched value for the mini-RCP was about 7.0 ft-lb/in with the break type being complete.

As for DSC data, the recrystallization peak for the mini-RCP of Example 1 was about 122° C., while recrystallization energy was about 90 J/g. The second melt peak for the mini-RCP of Example 1 was determined to be about 160° C., while the value for second melt energy was about 96 J/g.

The haze values for regrind passes 0, 2, and 5 for mini-RCP step chip plaques of Example 1 are also provided in Table 3. The thickness of the mini-RCP step chip plaques tested ranged from about 20 to about 80 millimeters (mils). The step chip plaques of Example 1 were molded at 220° C. under appropriate conditions known to those skilled in the art. For 20 mil plaques, the haze values for Example 1 over passes 0-5 ranged from about 5.7 to about 6.9%. For 40 mil plaques, the haze values ranged from about 17.3 to about 19.5% and for 60 mil plaques, the haze values ranged from about 22.1 to about 26.9%. As for the 80 mil plaques, the haze values ranged from about 26.3 to about 33.3%.

Example 1 therefore provides an indication of the desirable flexural, tensile, and Izod impact properties of the mini-RCP disclosed herein having an additive package including the Millad 3988 clarifier.

Example 2

The mini-RCP of Example 2 contained 900 ppm of alternative nucleating agent Na-11 The base formulation for Example 2, as in Example 1, was 400 ppm of Irganox® 1010, 1200 ppm Irgafos® 168, and 500 ppm of Pationic 940. Table 1 shows the additive package used (including various nucleating agents) for the evaluation of the mini-RCP of Example 2 as compared with the mini-RCP additive packages of Example 1 and Example 3. Test conditions for the mini-RCP of Example 2 were identical to those used in connection with the copolymer of Example 1.

As shown in Table 3, the 2% flexural modulus value for the mini-RCP of Example 2 was about 172,561 psi, while the 1% flexural modulus value was about 196,908 psi. The 0.4% flexural modulus value for Example 2 was about 205,170 psi, and the chord (4-8N) value for the copolymer was about 206,828 psi.

The mini-RCP resin of Example 2 also exhibited a desirable tensile modulus value of about 198,657 psi. Tensile strength at yield value for the mini-RCP was about 4,744 psi, while tensile strength at break value was about 2896 psi. The elongation at yield for the copolymer was about 14.2%, while elongation at break was about 104%. With regard to Izod values, the Izod impact, notched value for the mini-RCP was about 10.5 ft-lb/in with the break type being partial, rather than complete.

As for DSC data, the recrystallization peak for Example 2 was about 124° C., while recrystallization energy was about 93 J/g. The second melt peak for the mini-RCP of Example 2 was determined to be about 161° C., while the value for second melt energy was about 88 J/g.

The haze values for regrind passes 0, 2, and 5 for mini-RCP step chip plaques of Example 2 are also provided in Table 3. The thickness of the mini-RCP step chip plaques and the methods and test conditions were identical to those used in Example 1. For 20 mil plaques, the haze values for Example 2 over passes 0-5 ranged from about 6.0 to about 9.4%. For 40 mil plaques, the haze values ranged from about 19.9 to about 24.0%, and for 60 mil plaques, the haze values ranged from about 26.1 to about 34.7%. As for the 80 mil plaques, the haze values ranged from about 33.1 to about 44.4%.

Example 2 provides an indication of the desirable flexural, tensile, and Izod impact properties of the mini-RCP disclosed herein having an additive package including Na-11. It should be noted that Example 2 showed an increase in haze as compared to Example 1, which included the Millad 3988 clarifier.

Example 3

Example 3 contained 900 ppm of alternative nucleating agent Na-21. The base formulation for the sample, as in Example 1 and Example 2, was 400 ppm of Irganox® 1010, 1200 ppm of Irgafos® 168, and 500 ppm of Pationic 940. Table 2 shows the additive package used (including various nucleating agents) for the evaluation of the mini-RCP of Example 3 as compared with the mini-RCP additive packages of Example 1 and Example 2. Test conditions for the mini-RCP of Example 3 were identical to those used in connection with copolymers of Example 1 and Example 2.

As shown in Table 3, the 2% flexural modulus value for the mini-RCP of Example 3 was about 168,259 psi, while the 1% flexural modulus value was about 190,947 psi. The 0.4% flexural modulus value for Example 3 was about 199,063 psi, and the chord (4-8N) value for the copolymer was about 199,264 psi.

The mini-RCP of Example 3 also exhibited a desirable tensile modulus value of about 195,067 psi. Tensile strength at yield value for Example 3 was about 4,704 psi, while tensile strength at break value was about 2916 psi. The elongation at yield for the copolymer was about 13.7%, while elongation at break was about 111%. With regard to Izod values, the Izod impact, notched value for the mini-RCP was about 10.5 ft-lb/in, with the break type being determined to be partial, rather than complete.

As for DSC data, the recrystallization peak for Example 3 was about 120° C., while recrystallization energy was about 89 J/g. The second melt peak for the mini-RCP of Example 3 was determined to be about 160° C., while the value for second melt energy was about 96 J/g.

Additionally, the haze values for regrind passes 0, 2, and 5 for mini-RCP step chip plaques of Example 3 are provided in Table 3. The thickness of the mini-RCP step chip plaques and the methods and test conditions were identical to those used in Example 1 and Example 2. For 20 mil plaques the haze values for Example 3 over passes 0-5 ranged from about 5.5 to about 6.7%. For 40 mil plaques, the haze values ranged from about 18.4 to about 19.2% and for 60 mil plaques, the haze values ranged from about 25.8 to about 28.0%. As for the 80 mil plaques, the haze values ranged from about 33.6 to about 37.1%. It is interesting to note that the haze values actually decreased for Na-21 after regrind. Further, it was observed that as the polymeric material was reprocessed, the problems with plate-out decreased, and the additives became more fully dispersed in the resin. The results of this study therefore indicate that Na-21 may be the most effective, and therefore most desirable, nucleator for use in obtaining the best clarity of the mini-RCP material disclosed herein.

Table 3 below provides a summary of the physical properties for the mini-RCP resins tested in Examples 1-3 in addition to also summarizing the additive package for each mini-RCP.

TABLE 3

| | | Example 1 | Example 2 | Example 3 |
|---|---|---|---|---|
| Additive Package | | | | |
| Irganox ® 1010 | ppm | 400 | 400 | 400 |
| Irgafos ® 168 | ppm | 1200 | 1200 | 1200 |
| Pationic 940 | ppm | 500 | 500 | 500 |
| ADK NA-11 | ppm | | 900 | |
| Millad 3988 | ppm | 1800 | | |
| ADK NA-21 | ppm | | | 900 |
| Flexural Modulus (Instron) | | | | |
| 2% Flexural modulus | psi | 169115 | 172561 | 168259 |
| 1% Flexural modulus | psi | 191514 | 196908 | 190947 |
| 0.4% Flexural modulus | psi | 197759 | 205170 | 199063 |
| Chord (4-8 N) | | 198533 | 206828 | 199264 |
| Tensile modulus | | | | |
| Tensile modulus | psi | 180301 | 198657 | 195067 |
| Tensile strength at yield | psi | 4778 | 4744 | 4704 |
| Tensile strength at break | psi | 2794 | 2896 | 2916 |
| Elongation at yield | % | 13.7 | 14.2 | 13.7 |
| Elongation at break | % | 62 | 104 | 111 |
| Izod at 23 deg C. | | | | |
| Izod impact, notched | ft-lb/in | 7.0 | 10.5 | 10.5 |
| Break type | | complete | partial | partial |
| DSC | | | | |
| Recrystallization peak | deg C. | 122 | 124 | 120 |
| Recrystallization energy | J/g | 90 | 93 | 89 |
| Second melt peak | deg C. | 160 | 161 | 160 |
| Second melt energy | J/g | 96 | 88 | 96 |
| Haze on step chip plaques molded at 220 deg C. | | | | |
| Pass 0    20 mils | % | 5.7 | 6.0 | 5.5 |
|           40 mils | % | 17.3 | 19.9 | 19.2 |
|           60 mils | % | 22.1 | 26.1 | 26.9 |
|           80 mils | % | 26.3 | 33.1 | 33.6 |
| Pass 2    20 mils | % | 6.8 | 8.0 | 6.3 |
|           40 mils | % | 18.1 | 21.1 | 17.9 |
|           60 mils | % | 26.6 | 29.0 | 25.8 |
|           80 mils | % | 32.0 | 37.8 | 33.8 |
| Pass 5    20 mils | % | 6.9 | 9.4 | 6.7 |
|           40 mils | % | 19.5 | 24.0 | 18.4 |
|           60 mils | % | 26.9 | 34.7 | 28.0 |
|           80 mils | % | 33.3 | 44.4 | 37.1 |

Example 4

Further experiments were conducted to determine an ideal additive package for formulation of the mini-RCPs of the present invention. The goal of Example 4 was the evaluation of Millad 3988 clarifier in a mini-RCP having 0.6% $C_2$. The experimental copolymer product of Example 4 was evaluated in terms of flex modulus and thermal characteristics.

Table 4 below shows the additive package used for the evaluation of the mini-RCP composition of Example 4. The base formulation for Example 4 was 0.6 wt % $C_2$, 400 ppm Irganox® 1010, 1200 ppm Irgafos® 168, and 500 ppm Pationic 940. The mini-RCP of Example 4 contained 1800 ppm of the Millad 3988 clarifier. Example 4 was extruded with a MFR of about 2.8 and submitted to a five-pass regrind study with an extruder temperature of 525° F. Passes 2 to 5 were run with 100% regrind material.

Example 5

The mini-RCP of Example 5 contained 900 ppm of the alternative nucleating agent Na-11. The polymerization conditions, test conditions, and base formulation for Example 5 were identical to those used for Example 4. Table 4 below shows the additive package used for the evaluation of the mini-RCP composition of Example 5.

Example 6

The mini-RCP of Example 6 contained 900 ppm of alternative nucleating agent Na-21. Polymerization conditions, test conditions, and base formulation for Example 6 were identical to those used in Examples 4 and 5. Table 4 shows the additive package used for the evaluation of the mini-RCP composition of Example 6.

TABLE 4

| Characteristics/SX | Example 4 | Example 5 | Example 6 |
|---|---|---|---|
| Ethylene Content, % | 0.6 | 0.6 | 0.6 |
| Irganox 1010, ppm | 400 | 400 | 400 |
| Irgafos 168, ppm | 1200 | 1200 | 1200 |
| Pationic 940, ppm | 500 | 500 | 500 |
| ADK Na-11, ppm | | 900 | |
| Millad 3988, ppm | 1800 | | |
| ADK Na-21, ppm | | | 900 |

Table 5 below provides a summary of the thermal properties of the mini-RCPs tested in Examples 4, 5, and 6.

TABLE 5

| | Sample | | |
|---|---|---|---|
| | Example 4 | Example 5 | Example 6 |
| $T_c$, deg. C. | 122.0 | 124.0 | 120.3 |
| $\Delta H_c$, J/g | 89.6 | 92.6 | 88.5 |
| $T_m$, deg. C. | 159.7 | 160.7 | 160.4 |
| $\Delta H_c$, J/g | 95.6 | 88.4 | 95.8 |

As presented in Table 5, the recrystallization temperature $T_c$ value of Example 4 was about 122° C., while $\Delta H_c$ was about 89.6 J/g. The peak melting temperature $T_m$ of Example 4 was about 159.7° C. with a $\Delta H_c$ value of about 95.6 J/g. In addition, the recrystallization temperature $T_c$ value of Example 5 was about 124° C., while $\Delta H_c$ was about 92.6 J/g. The peak melting temperature $T_m$ of Example 5 was about 160.7° C. with a $\Delta H_c$ value of about 88.4 J/g. Further, the recrystallization temperature $T_c$ value of Example 6 was about 120.3° C., while $\Delta H_c$ was about 88.5 J/g. The peak melting temperature $T_m$ of Example 6 was about 160.4° C. with a $\Delta H_c$ value of about 95.8 J/g.

Flexural moduli of samples formulated with Millad 3988 (Example 4), Na-11 (Example 5), and Na-21 (Example 6) as the clarifier/nucleating agent were measured on injection-molded test bars according to ASTM D-790. FIG. 1 is a graphical illustration of these flexural moduli. As shown in FIG. 1, Example 4 had a 2% flexural modulus value of about 168,000 psi, a 1% flexural modulus value of about 192,000 psi, and a 0.4% flexural modulus value of about 198,000 psi. Example 5 had a 2% flexural modulus value of about 173,000 psi, a 1% flexural modulus value of about 197,000 psi, and a 0.4% flexural modulus value of about 205,000 psi. Also, Example 6 had a 2% flexural modulus value of about 168,000 psi, a 1% flexural modulus value of about 192,000 psi, and a 0.4% flexural modulus value of about 199,000 psi.

The results of this study show that the flexural modulus properties between grades clarified with Millad 3988 and Na-21 are very similar. Na-11 is well known to be an excellent nucleator and therefore will cause an increase in stiffness as compared to Millad 3988 and Na-21, as can be seen in FIG. 1, which shows the overall increased modulus values for Na-11, as compared to Millad 3988 and Na-21. The 900 ppm Na-11 present in the additive package of Example 5 also results in a higher value for $T_c$ (124.0° C.) as compared to that of Example 4 (122.0° C.) and Example 6 (120.3° C.). It is encouraging that the formulation of Example 6 gives comparable results to the formulation of Example 4 because the Millad 3988 of Example 4 is more expensive to use than the Na-21 of Example 6. Based on these results, Na-21 can directly compete with Millad 3988 in terms of haze performance if the Na-21 is sufficiently dispersed. The data further illustrates that comparable results to Millad 3988 can be obtained with half as much Na-21, thereby resulting in savings for production of clear mini-RCPs.

These results led to the introduction of the commercially available FINA EOD 00-28 (EOD 00-28) having a MFR of 2 g/10 min, 0.6 wt % $C_2$ content, and the following additive package: 400 ppm Irganox® 1010, 1200 ppm Irgafos® 168, 400 ppm Pationic 940, and 900 ppm ADK Na-21. As can be seen, the differences between 1800 ppm Millad 3988 and 900 ppm Na-21 are not very significant with the exception of a 1.7° C. difference in recrystallization temperature Tc.

Example 7

It has been determined that haze performance as measured after passes 0, 2, and 5 provides an accurate evaluation of the thermal stability of a particular clarifier. In the event that a clarifier is not thermally stable, a decrease in transparency should be apparent. The base formulation for the mini-RCP of Example 7 was 0.6 % $C_2$, 400 ppm of Irganox® 1010, 1200 ppm of Irgafos® 168, and 500 ppm of Pationic 940. The MFR was about 2.8 dg/min, and the additive package of Example 7 also contained 1800 ppm of the Millad 3988 clarifier. The mini-rep of Example 7 was submitted to a five-pass regrind study with an extruder temperature of 525° F. Passes 2 to 5 were run with 100% regrind material. After passes 0, 2, and 5, the mini-rep was injection-molded into step chip plaques that were then subjected to haze measurements. The plaques were formed under appropriate conditions known to those skilled in the art.

Figure 2:
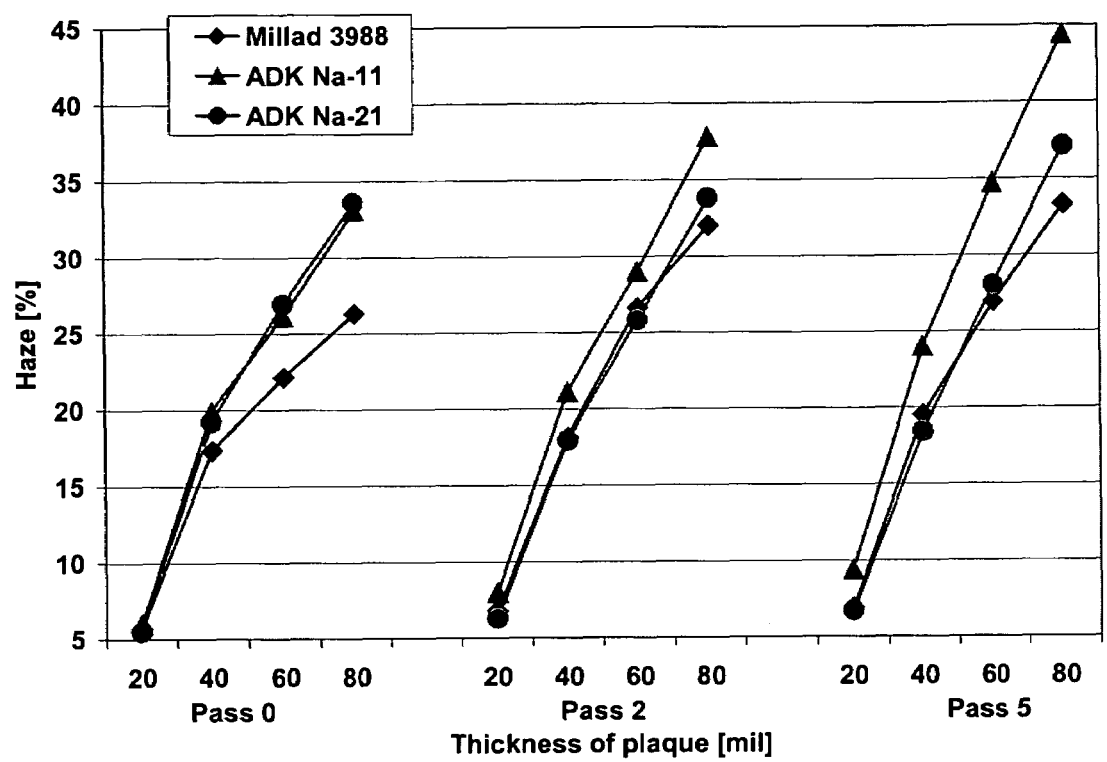
FIG. 2 illustrates haze as a function of the plaque thickness for random ethylene-propylene copolymers formulated with different nucleating agents.

FIG. 2 provides a graphical summary of these haze measurements. The haze values ranged from about 5 to about 7% for 20 mil plaques, from about 17 to about 19% for 40 mil plaques, from about 22 to about 27% for 60 mil plaques, and from about 27 to about 34% for 80 mil plaques.

Example 8

In another embodiment of the mini-RCP disclosed herein, a haze study of Example 8 utilized injection-molded step chip plaques formed from a mini-RCP containing 900 ppm of the Na-11 alternative nucleating agent, rather than the Millad 3988 clarifier present in Example 7. As with Example 7, the plaques of Example 8 were formed under appropriate conditions known to those skilled in the art. Base formulation and test conditions for the haze study conducted in Example 8 were identical to those used in Example 7.

As shown in FIG. 2, the mini-RCP of Example 8 exhibited haze values ranging from about 5 to about 7% for 20 mil plaques, from about 20 to about 24% for 40 mil plaques, from about 26 to about 34% for 60 mil plaques, and from about 33 to about 45% for 80 mil plaques.

Example 9

In a further embodiment of the polymeric material disclosed herein, a haze study of Example 9 utilized injection-molded step chip plaques formed from a mini-RCP resin containing 900 ppm of the Na-21 alternative nucleating agent, rather than the Millad 3988 clarifier of Example 7 or the Na-11 nucleating agent of Example 8. As with Examples 7 and 8, the plaques of Example 9 were formed under appropriate conditions known to those skilled in the art. Base formulation and test conditions for the haze study conducted in Example 9 were identical to those used in Examples 7 and 8.

As depicted in FIG. 2, the mini-RCP of Example 9 exhibited haze values ranging from about 5 to about 7% for 20 mil plaques, from about 18 to about 20% for 40 mil plaques, from about 20 to about 28% for 60 mil plaques, and from about 34 to about 38% for 80 mil plaques.

The results of this experiment show that Na-21 is thermally stable and is very similar to Millad 3988 in terms of the effect on haze values for mini-RCPs. As shown in FIG. 2, the min-reps containing Millad 3988 and Na-21 performed similarly in terms of haze values, with the exception of the thicker plaques (about 80 mil thickness). After pass 2, for example, haze values for mini-RCPs with either Millad 3988 or Na-21 ranged from about 5 to about 30% over a plaque thickness range of from about 20 to about 70 mil. After pass 5, haze values for the same mini-RCP samples ranged from about 5 to about 27% over a plaque thickness ranging from about 20 to about 60 mil.

In addition, the haze performance of Na-21 relative to Millad 3988 actually improved after being extruded several times. This characteristic indicates that the haze performance of Na-21 is strongly dependent upon dispersion (more dispersion occurs with each pass), suggesting that Na-21 can more easily be used as a replacement for Millad 3988 in low melt flow grades than high melt flow grades given that additional shear will facilitate dispersion. Dispersion appears to be critical for the effectivness of Na-21 as a clarifier. In an embodiment of the invention, regrind techniques known in the art can be used to achieve better dispersion and thereby decrease haze values. In alternative embodiments of the present invention, finer screen packs or lower temperatures in extrusion at the plant may facilitate dispersion and decrease haze.

Further, the mini-reps containing Na-11 and Na-21 performed almost identically after pass 0, with those mini-reps showing approximately the same transparency independent of the thickness of the plaque. However, the haze values of those mini-reps differed significantly after passes 2 and 5.

Comparative Example 1

In an effort to produce a mini-RCP useful in production of clarified extrusion grades, the experimental resin EOD 00-28 was developed. EOD-00-28 uses 1000 ppm Na-21 as the clarifier and has 0.6 wt % ethylene which meets the $C_2$ content criteria for a mini-RCP. The standard used for comparison in this study is sold by Atofina Petrochemicals under the tradename of FINA 3289M. (3289M). The standard is a well established resin product that is known to have good characteristics, including desirable optical properties and processability. 3289M is a polypropylene (PP) homopolymer containing 0.20 wt % Millad 3988 clarifier.

An experiment was conducted wherein the EOD 00-28 mini-RCP was compared to the 3289M PP homopolymer having an additive package as indicated below in Table 6. Both materials were formed using a Ziegler-Natta catalyst, and both were injection molded according to ASTM methods into tensile, flex, and izod bars. A summary of the basic physical properties of the 3289M PP homopolymer and the EOD 00-28 mini-RCP is provided in Table 6 below, along with the particular additive package of each sample. As can be seen, the EOD 00-28 mini-RCP and the 3289 PP homopolymer appear identical in terms of levels of xylene solubles (about 4%). The EOD 00-28 mini-RCP does exhibit a lower melting point (160° C.) than that of the 3289M PP homopolymer (163° C.), while the MFR of the EOD 00-28 mini-RCP is slightly higher (2.0 g/10 min) than the MFR of the 3289M PP homopolymer (1.8 g/10 min).

TABLE 6

|  | ATOFINA 3289M Lot # 55306 | ATOFINA EOD 00-28 Lot # 57338 |
|---|---|---|
| Polymer type | Homopolymer | mini-RCP |
| $C_2$ % | 0 | 0.6 |
| Melting point (° C.) | 163 | 160 |
| Melt Flow Rate (g/10 min) | 1.8 | 2.0 |
| Xylene Sols. (%) | 4.0 | 4.0 |
| Notched Izod Impact @ 73° F., (ft Lb/in): | 0.8 | 1.3 |
| Notched Izod Impact (J/m) | 43 | 70 |
| HDT @ 66 psi, (° C.) | 89 | 92 |
| ADDITIVES |  |  |
| Irganox ® 1010, ppm | 400 | 400 |
| Millad 3988, ppm | 2000 | 0 |
| Irgafos ® 168, ppm | 1200 | 1200 |
| Pationic 940, ppm | 400 | 400 |
| ADK Na-21, ppm | 0 | 1000 |

The EOD 00-28 mini-rep and the 3289M PP homopolymer were both processed under identical conditions on a 3.5 inch Welex sheet line and each was extruded into 20 and 40 mil sheets. Typical extrusion conditions for the 3289M sample were used and are tabulated in Table 7 below. The 40 mil mini-RCP sheet was optimized for clarity and used cooler processing temperatures, also tabulated in Table 7.

TABLE 7

|  | Typical Temperature | | Cooler Temperatures Needed for 40 mil 00-28 | |
|---|---|---|---|---|
|  | F | C | F | C |
| Extrusion Parameter |  |  |  |  |
| Rear Zone 1 | 340 | 171 | 340 | 171 |
| Zone 2 | 370 | 188 | 370 | 188 |
| Zone 3 | 420 | 216 | 400 | 204 |
| Zone 4 | 450 | 232 | 430 | 221 |
| Zone 5 | 460 | 238 | 440 | 227 |
| Zone 6 | 460 | 238 | 440 | 227 |
| Scn Chg/Adpt/Mixer | 470 | 243 | 450 | 232 |
| Feed Block | 490 | 254 | 470 | 243 |
| Die | 490 | 254 | 470 | 243 |
| Melt | 466 | 241 | 453 | 234 |
| Chrome Rolls |  |  |  |  |
| Top Roll | 190 | 88 | 170 | 77 |
| Middle Roll | 210 | 99 | 200 | 93 |
| Bottom Roll | 200 | 93 | 210 | 99 |

Prior art difficulties of repeating thin spots in the sheets were encountered with the 3289M PP homopolymer at the 20 mil thickness. With the EOD 00-28 mini-rep, however, the difficulty of repeating thin spots was much less prominent.

Another result was that the EOD 00-28 mini-rep smoked less at the die than did the 3289M PP homopolymer. Processing with less smoke is desired because smoke and/or plate-out problems contribute to fouling the dies and rollers. To maintain proper operational characteristics, the dies and/or rollers must be cleaned as they become fouled. Production plants commonly have a loss in productivity when the dies and/or rollers must be taken off-line to be cleaned. Accordingly, lengthening the intervals between cleanings of the dies and/or rollers is a benefit.

The EOD 00-28 mini-rep and the 3289M PP homopolymer processed equally well at the 40 mil thickness. Table below provides a summary of the mechanical properties for the extruded materials. As expected, the EOD 00-28 mini-RCP has a lower flex (about 13% lower) and slightly higher elongation at break than the 3289M PP homopolymer. The EOD 00-28 mini-RCP is therefore also less brittle than the 3289M PP homopolymer. These desirable physical properties of the EOD 00-28 mini-RCP are due at least in part to the random 0.6% $C_2$ incorporated therein.

TABLE 8

|  | Type | |
| --- | --- | --- |
|  | 3289 | EOD 00 |
|  | Lot | |
|  | 55306 | 57338 |
| Flex Modulus (psi) | 230,000 | 200,000 |
| Flex Modulus (Mpa) | 1585 | 1378 |
| Tensile modulus (psi) | 200,000 | 200,000 |
| Tensile modulus (Mpa) | 1378 | 1378 |
| Tensile Strength at Yield | 5100 | 4800 |
| Tensile Strength at Yield | 35 | 33 |
| Tensile Strength at Break | 3200 | 3300 |
| Tensile Strength at Break | 22 | 21 |
| Elongation at Yield | 14.2 | 14.2 |
| Elongation at Break | 57 | 73 |
| HDT | 89 | 92 |
| Color L, | 77.2 | 76.3 |
| Color a, | −1.1 | −0.8 |
| Color b, | 0.0 | 0.3 |
| Yellowness | −1.0 | 0.0 |

Figure 3:
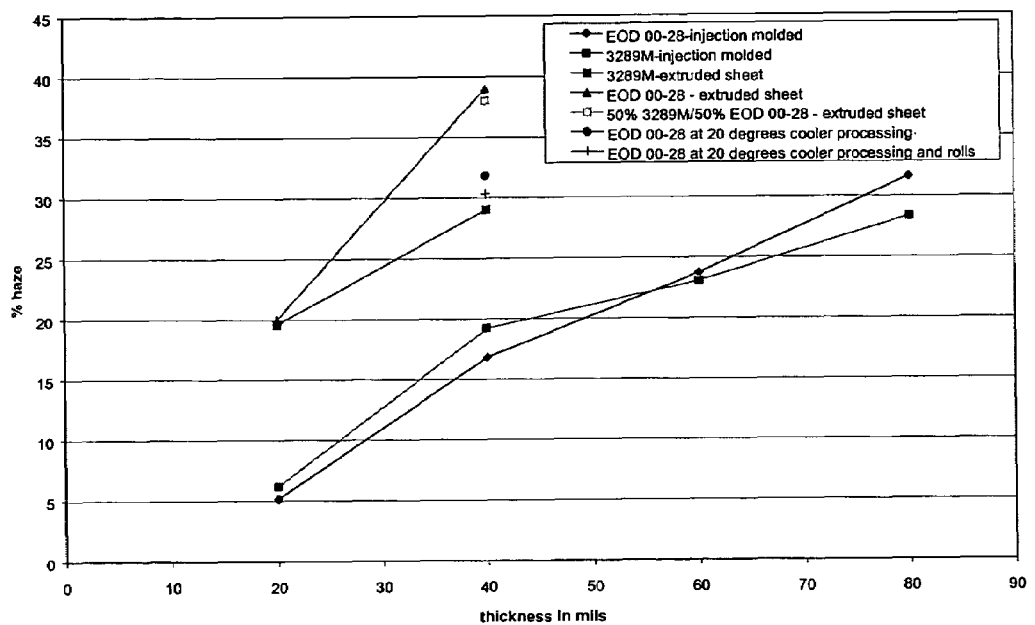
FIG. 3 illustrates haze as a function of the plaque thickness for different extrusion grades of a random ethylene-propylene copolymer, a conventional PP homopolymer, and a combination thereof.

The suitability of the present invention is further illustrated by reference to FIG. 3, a graphical illustration of the haze values for various extrusion grades. FIG. 3 illustrates that the mini-RCPs of the present invention exhibit improved clarity over the PP homopolymers of the prior art with lower quantities of clarity additives.

The EOD 00-28 mini-rep and the 3289M PP homopolymer exhibited identical clarity in the injection molded step chips and in the 20 mil thickness extruded sheet, although the extruded sheet values were shifted higher due to surface finish. With regard to the 40 mil thickness extruded sheet, however, FIG. 3 indicates that an approximately 10% higher haze value was observed for the EOD 00-28 mini-rep when using processing conditions typically used for the 3289M PP homopolymer.

A lower temperature profile (by approximately 20° F.) was explored in an attempt to achieve lower haze values for the EOD 00-28 mini-RCP. It was determined that the mini-RCP approached expected haze values upon lowering the extruder and die temperatures by 20° F. Further cooling of the chill rolls helped slightly. Lowering the temperature of the extruder, die, and/or chill rolls resulted in an increase in the processability of the resin and productivity of the production facility.

As shown in FIG. 3, a 50/50 blend of the 3289M PP homopolymer and the EOD 00-28 mini-RCP was also formed that had higher haze values (by about 20%) similar to the initial mini-RCP haze values at the higher temperature profile. The blend was used to simulate the possibility for customers to use both nucleated and clarified grade without having to separate regrind streams.

To summarize, the EOD 00-28/Na-21 based extrusion grade material performed well overall, processing better than the 3289M resin at thin gauge (20 mil). The EOD 00-28 mini-rep gave comparable clarity in injection molded plaques and 20 mil extruded sheets when compared to the 3289M PP homopolymer. In order to obtain clarity equal to that of the 3289M PP homopolymer, the processing temperatures for the EOD 00-28 mini-rep were decreased by 20° F. at thicker gauge (40 mil) extruded sheets. A physical property analysis showed that the EOD 00-28 mini-rep was about 13% more flexible than the 3289M PP homopolymer (flex modulus of 2.0 E+05 psi for EOD 00-28 versus 2.3 E+05 psi for 3289M). The EOD 00-28 mini-rep also showed a slightly higher elongation at break (about 73%) than the 3289M PP homopolymer (about 57%), due in large part to the 0.6% $C_2$ content of the EOD 00-28 mini-rep.

Comparative Example 2

Having illustrated that mini-RCPs with clarifiers have increased processability as compared to that of PP homopolymers, a further study was conducted wherein 3 mini-RCP samples were compared to 3 PP homopolymer samples and a 3289M PP homopolymer control standard. The 3 mini-rep samples and the 3 PP homopolymer samples were formulated to contain 0.6 wt % $C_2$. Varying levels of the MILLAD 3988 clarifier were added to each sample and the standard. The results are summarized in Table 9 below.

TABLE 9

| PRODUCT | STD | Sx 1 | Sx 2 | Sx 3 | Sx 4 | Sx 5 | Sx 6 |
| --- | --- | --- | --- | --- | --- | --- | --- |
| Type | HPP | RCP | RCP | RCP | HPP | HPP | HPP |
| C2, %: | 0 | 0.6 | 0.6 | 0.6 | 0 | 0 | 0 |
| MILLAD 3988, %: | 0.20 | 0.14 | 0.17 | 0.20 | 0.14 | 0.17 | 0.20 |
| Pellet, MFR, g/10 min: | 1.7 | 2.8 | 2.7 | 2.9 | 2.6 | 2.8 | 2.9 |
| Hunter b Color, n: | −0.28 | −0.68 | −0.79 | −1.0 | −1.0 | −1.0 | −1.1 |
| Gloss, 45 deg, %: | 55 | 53 | 54 | 56 | 53 | 54 | 54 |
| Haze @ 50 mil, %: | 18 | 28 | 22 | 17 | 30 | 23 | 20 |

TABLE 9-continued

| PRODUCT | STD | Sx 1 | Sx 2 | Sx 3 | Sx 4 | Sx 5 | Sx 6 |
|---|---|---|---|---|---|---|---|
| DSC | | | | | | | |
| Thermogram Melt P., C.: | 165 | 159 | 159 | 160 | 166 | 165 | 166 |
| Recrystal. Temp., C.: | 125 | 122 | 122 | 122 | 125 | 126 | 126 |
| Flex Modulus @ 2%, psi: | 200,000 | 189,000 | 193,000 | 192,000 | 209,000 | 213,000 | 213,000 |
| Notched Izod, in * lb: | 1.1 | 0.9 | 1.0 | 1.1 | 0.9 | 1.0 | 0.9 |

*Each lab sample was formulated with 0.04% Irganox 1010, 0.12% Irgafos 168,

As expected, as the percentage of clarifier increased in the samples, the haze values at 50 mil thickness decreased. However, the haze values for the mini-RCP samples were unexpectedly lower (ranged from about 17 to about 28% for 50 mil thickness) than the haze values for the PP homopolymer samples (ranged from about 20 to about 30% for 50 mil thickness). Also, in test run 3, the mini-RCP sample with 0.20 wt % MILLAD 3988 demonstrated an improved haze value as compared to the 3289M standard. Further, the mini-rep samples not only showed improved clarity, but also showed the enhanced processability attributable to being a mini-RCP. The improved processability of the mini-RCP samples was illustrated by their slightly lower melting points (range from about 159 to about 160° C.) and recrystallization temperatures (about 122° C.). Further, the mini-rep samples had lower values for the 2% flex modulus (range from about 189,000 to about 192,000 psi) than the PP homopolymer samples (range from about 209,000 to about 213,000 psi), indicating that the mini-RCP resin is less brittle and thus more suitable for use in thin-cross-section parts. The lab produced mini-RCPs demonstrated a ten percent (10%) reduction in stiffness as compared to the PP homopolymer samples and a five (5%) reduction in stiffness as compared to the standard.

Surprisingly, the values for the notched Izod test were similar to the standard. Accordingly, the mini-RCPs have increased clarity (reduced haze) and no appreciable decrease in strength. Therefore, the mini-RCPs provide an ideal balance of properties for end products ranging from injection molded articles to blow molded articles to film extruded articles.

Having described specific embodiments of the present invention, it will be understood that modifications thereof may be suggested to those skilled in the art, and it is intended to cover all such modifications as fall within the scope of the appended claims.

The invention claimed is:

1. A propylene random copolymer composition comprising:
    a propylene random copolymer comprising:
        from about 95.0 wt % to about 99.0 wt % propylene; and
        from about 0.2 wt % to about 0.8 wt % ethylene;
    an additive selected from clarifiers, nucleators and combinations thereof; and
    a stabilizer, wherein the propylene random copolymer exhibits a melt flow rate (ASTM D1238) of from about 0.5 g/10 min to about 4.0 g/10 min, a molecular weight distribution of from 5 to 10 and wherein the propylene random copolymer composition exhibits a 1% flexural modulus (ASTM D790) of from about 180,000 psi to about 220,000 psi.

2. The propylene random copolymer composition of claim 1, wherein the random copolymer composition is formed by a Zieger-Natta catalyst.

3. A polymer article formed from the propylene random copolymer composition of claim 1.

4. The propylene random copolymer composition of claim 1 further comprising a fluoropolymer.

5. The propylene random copolymer composition of claim 1, wherein the additive is present in an amount of from about 900 ppm to about 3500 ppm.

* * * * *